United States Patent
Goodwin et al.

(10) Patent No.: US 7,222,297 B2
(45) Date of Patent: May 22, 2007

(54) SYSTEM AND METHOD FOR USING XML TO NORMALIZE DOCUMENTS

(75) Inventors: James Patrick Goodwin, Beverly, MA (US); Paul Lewis Wilson, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 857 days.

(21) Appl. No.: 10/044,913

(22) Filed: Jan. 15, 2002

(65) Prior Publication Data

US 2003/0135516 A1    Jul. 17, 2003

Related U.S. Application Data

(60) Provisional application No. 60/347,283, filed on Jan. 14, 2002.

(51) Int. Cl.
*G06N 3/00* (2006.01)
(52) U.S. Cl. ..................................... 715/513
(58) Field of Classification Search ............... 715/513, 715/517, 523, 530
See application file for complete search history.

(56) References Cited

U.S. PATENT DOCUMENTS

| | | | |
|---|---|---|---|
| 4,744,028 A | 5/1988 | Karmarkar | 364/402 |
| 5,740,549 A | 4/1998 | Reilly et al. | 705/14 |
| 5,761,512 A | 6/1998 | Breslau et al. | 395/705 |
| 5,895,470 A | 4/1999 | Pirolli et al. | 707/102 |
| 6,041,311 A | 3/2000 | Chislenko et al. | 705/27 |
| 6,078,918 A | 6/2000 | Allen et al. | 707/6 |
| 6,115,709 A | 9/2000 | Gilmour et al. | 707/9 |

(Continued)

FOREIGN PATENT DOCUMENTS

| EP | 1 087 306 | 3/2001 |
|---|---|---|
| EP | 1 143 356 | 10/2001 |

OTHER PUBLICATIONS

Maybury et al., "Expert Finding for Collaborative Virtual Environments", *Communications of the ACM*, vol. 44, No. 12, Dec. 2001, pp. 1, 2, 55, 56.

(Continued)

*Primary Examiner*—Stephen Hong
*Assistant Examiner*—Kyle Stork
(74) *Attorney, Agent, or Firm*—Pillsbury Winthrop Shaw Pittman, LLP

(57) ABSTRACT

A system, method, and processor readable medium for normalizing documents using extensible markup language (XML). The system may determine a type of object repository storing at least one object. The object may include metadata. The system may then identify the object stored in the object repository. At least one portion of the one object may be extracted from the repository, wherein the portion is extracted in extensible markup language (XML) format. Preferably, some of the metadata is preserved. The metadata preserved may include at least one of author, title, subject, date created, date modified, list of modifiers, and link list information. The portion may then be transmitted to a processor. The processor may perform one or more processes on the portion. A mapping may be performed that maps at least one field in the object with a field designation identifier. The processor may include at least one of a full-text engine, a metrics engine, and a taxonomy engine.

20 Claims, 5 Drawing Sheets

U.S. PATENT DOCUMENTS

| | | | | |
|---|---|---|---|---|
| 6,144,944 | A | 11/2000 | Kurtzman, II et al. | 705/14 |
| 6,154,783 | A | 11/2000 | Gilmour et al. | 709/245 |
| 6,205,472 | B1 | 3/2001 | Gilmour | 709/206 |
| 6,208,994 | B1 | 3/2001 | Abdelnur | 707/103 |
| 6,240,466 | B1 | 5/2001 | McKeehan et al. | 709/316 |
| 6,349,295 | B1 | 2/2002 | Tedesco et al. | 707/3 |
| 6,353,840 | B2 * | 3/2002 | Saito et al. | 715/517 |
| 6,377,949 | B1 | 4/2002 | Gilmour | 707/10 |
| 6,377,983 | B1 | 4/2002 | Cohen et al. | 709/217 |
| 6,397,203 | B1 | 5/2002 | Hembry | 707/2 |
| 6,405,197 | B2 | 6/2002 | Gilmour | 707/5 |
| 6,421,669 | B1 | 7/2002 | Gilmour et al. | 707/9 |
| 6,513,039 | B1 | 1/2003 | Kraenzel | 707/9 |
| 6,516,350 | B1 | 2/2003 | Lumelsky et al. | 709/226 |
| 6,560,588 | B1 | 5/2003 | Minter | 706/50 |
| 6,604,110 | B1 * | 8/2003 | Savage et al. | 707/102 |
| 6,626,957 | B1 * | 9/2003 | Lippert et al. | 715/513 |
| 6,633,916 | B2 | 10/2003 | Kauffman | 709/229 |
| 6,640,229 | B1 | 10/2003 | Gilmour et al. | 707/9 |
| 6,647,384 | B2 | 11/2003 | Gilmour | 707/5 |
| 6,668,251 | B1 | 12/2003 | Goldberg | 707/5 |
| 6,687,873 | B1 * | 2/2004 | Ballantyne et al. | 715/500 |
| 6,697,800 | B1 | 2/2004 | Jannink et al. | 707/5 |
| 6,711,570 | B1 | 3/2004 | Goldberg et al. | 707/6 |
| 6,714,936 | B1 | 3/2004 | Nevin, III | 707/102 |
| 6,732,331 | B1 * | 5/2004 | Alexander | 715/513 |
| 6,754,648 | B1 * | 6/2004 | Fittges et al. | 707/1 |
| 6,772,137 | B1 * | 8/2004 | Hurwood et al. | 707/2 |
| 6,789,054 | B1 | 9/2004 | Makhlouf | 703/6 |
| 6,801,940 | B1 | 10/2004 | Moran et al. | 709/224 |
| 6,816,456 | B1 | 11/2004 | Tse-Au | 370/230.1 |
| 6,832,224 | B2 | 12/2004 | Gilmour | 707/100 |
| 6,836,797 | B2 | 12/2004 | Givoly et al. | 709/223 |
| 2002/0049621 | A1 | 4/2002 | Bruce | 705/7 |
| 2002/0049750 | A1 | 4/2002 | Venkatram | 707/3 |
| 2002/0078003 | A1 | 6/2002 | Krysiak et al. | 707/1 |
| 2002/0087600 | A1 | 7/2002 | Newbold | 715/514 |
| 2002/0107861 | A1 * | 8/2002 | Clendinning et al. | 707/101 |
| 2002/0152244 | A1 * | 10/2002 | Dean et al. | 707/530 |
| 2003/0028525 | A1 | 2/2003 | Santos et al. | 707/3 |
| 2003/0105732 | A1 | 6/2003 | Kagalwala et al. | 707/1 |
| 2004/0111386 | A1 | 6/2004 | Goldberg et al. | 707/1 |
| 2004/0205548 | A1 * | 10/2004 | Bax et al. | 715/513 |

OTHER PUBLICATIONS

Mattox et al., "Enterprise Expert and Knowledge Discovery", *Proceedings of the International Conference on Human Computer Interaction Conference*, Aug. 23-27, 1999, Munich, Germany, 11 pages.

"Automated Expertise Profiling Saves Time", http://www.tacit.com/products/profiling.html, printed Jan. 9, 2002, 3 pages.

"KnowledgeMail", http://www.tacit.com/products/knowledgemail.html, printed Jan. 9, 2002, 3 pages.

"Expertise Discovery & Search", http://www.tacit.com/products/espdiscovery.html, printed Jan. 9, 2002, 2 pages.

Vivacqua, Adriana, et al., "Agents to Assist in Finding Help", *Conference on Human Factors & Computing Systems proceedings*, in the Hague, the Netherlands, Apr. 2000, pp. 65-72.

Tacit, KnowledgeMail & KnowledgeMail Plus, "Creating the Smarter Enterprise" (Tacit Knowledge Systems, Inc., © May 2001).

http://www.forbes.com/global/2001/0205/088_print.html, as it appears on Feb. 26, 2001.

McDonald, David W., "Evaluating Expertise Recommendations", *Proceedings of the 2001 International ACM SIGGROUP Conference on Supporting Group Work*, in Boulder, Colorado, Oct. 2, 2001, pp. 214-223.

http://www.tacit.com, as it appears on Dec. 7, 2000.

* cited by examiner

SYSTEM AND METHOD FOR USING XML TO NORMALIZE DOCUMENTS

RELATED APPLICATIONS

This application claims priority from U.S. Provisional Patent Application Ser. No. 60/347,283, filed Jan. 14, 2002, titled, "Knowledge Server," which is hereby incorporated by reference. This application is related to co-pending patent application Ser. No. 10/045,064, titled, "System and Method for Processing Data in a Distributed Architecture," filed Jan. 15, 2002, which is hereby incorporated by reference.

FIELD OF THE INVENTION

The invention relates to a system and method for normalizing documents using extensible markup language (XML).

BACKGROUND OF THE INVENTION

Knowledge management systems are known. Knowledge management systems may be used to collect information from information systems within an organization. The knowledge management system may perform one or more processing actions on the information, such as, for example, categorization, full-text indexing, and metrics extraction. Each of these processes, however, are typically performed synchronously. Therefore, the information may only be available in each information system at varying times. A particular information system may be updated with other information and the information system may not be accessible for an extended period of time. This results in higher development costs and extended customer disruptions.

Current knowledge management systems typically use a single process for performing one or more processes on information collected from the information systems. Therefore, if an information system fails, information may be lost. This is a drawback.

These and other drawbacks exist.

SUMMARY OF THE INVENTION

An object of the invention is to overcome these and other drawbacks of existing systems.

Another object of the invention is to provide a system and method for normalizing documents using extensible markup language (XML).

Another object of the invention is to provide a system and method for normalizing documents using XML that enables meta data in a document to be preserved.

Another object of the invention is to provide a system and method for normalizing documents using XML that maps fields within the document with at least one field designation identifier.

Another object of the invention is to provide a system and method for normalizing documents using XML that provides full-text indexing, categorizing, and metrics extraction.

Another object of the invention is to provide a system and method for processing data that performs one or more processes information in an asynchronous manner.

Another object of the invention is to provide a system and method for data processing that processes information in a parallel manner.

Another object of the invention is to provide a system and method for data processing that enables recovery of information in the event of a system failure.

These and other objects of the invention are achieved according to various embodiments of the invention. A system, method, and processor readable medium for normalizing documents using extensible markup language (XML). The system may determine a type of object repository storing at least one object. The object may include metadata. The system may then identify the object stored in the object repository. At least one portion of the one object may be extracted from the repository, wherein the portion is extracted in extensible markup language (XML) format. Preferably, some of the metadata is preserved. The metadata preserved may include at least one of author, title, subject, date created, date modified, list of modifiers, and link list information. The portion may then be transmitted to a processor. The processor may perform one or more processes on the portion. A mapping may be performed that maps at least one field in the object with a field designation identifier. The processor may include at least one of a full-text engine, a metrics engine, and a taxonomy engine.

These and other objects, features and advantages of the invention will be readily apparent to those having ordinary skill in the pertinent art from the detailed descriptions of the embodiments with reference to the appropriate figures below.

BRIEF DESCRIPTIONS OF THE DRAWINGS

DETAILED DESCRIPTION OF PREFERRED EMBODIMENTS

A system, method, and processor readable medium for processing data in a knowledge management system is disclosed. The system may asynchronously process data such that multiple processes are performed simultaneously. The system may perform categorization, full-text indexing, and metrics extraction, or other process simultaneously, such that a repository is maintained with current information and in the event of a failure, the likelihood of recovering information is greater.

Figure 1:
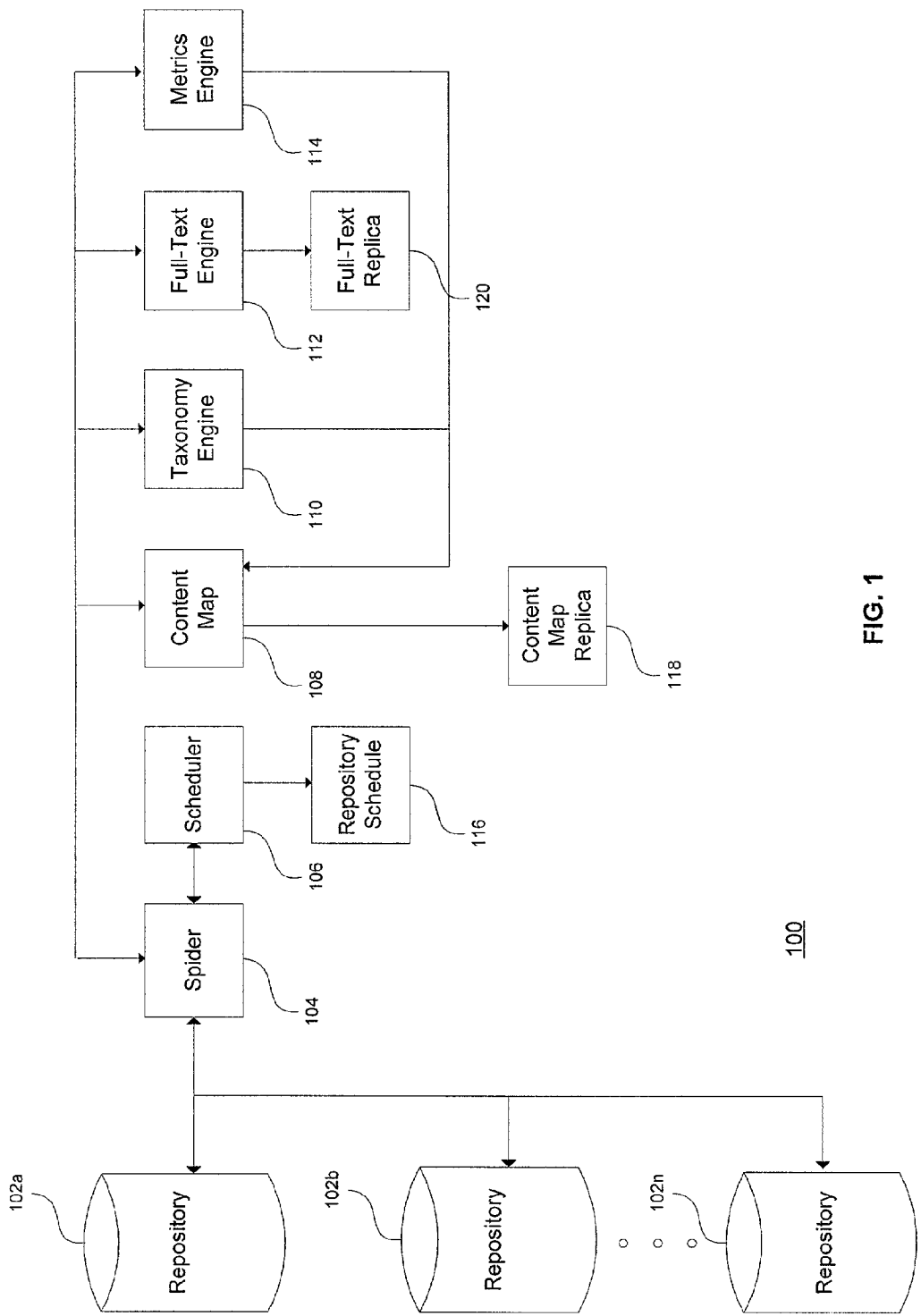
FIG. 1 is a schematic block diagram of a system for data processing according to one embodiment of the invention.

FIG. 1 illustrates a system 100 for asynchronously processing data according to one of the embodiment of the invention. System 100 may include repositories 102*a*-102*n*. Repositories 102*a*-102*n* may be in communication with spider component 104. A spider component may be, for example, a Domino add-in process that invokes threads to explore different repositories. Different spider types may be designed to extract content from various content repository types. Once a spider process is started, spider component 104 may start any number of additional threads to explore different repositories, including, for example, Lotus Notes™, Lotus QuickPlace™, Domino.Doc, electronic mail (Lotus Domino™), Web and file system. This enables one server to use a Lotus Notes™ spider and a second server to use a Lotus Notes™ and file system spider.

Spider component 104 may be in communication with a scheduler 106, content map component 108, taxonomy engine 110, full-text engine 112, and metrics engine 114. Spider component 104 may also communicate with content map 108, taxonomy engine 110, full-text engine 112, and metrics engine 114 to update and make available information stored in repositories 102a-102n in a variety of formats. Spider component 104 may receive work requests, on a scheduled basis, from scheduler 106 that describe which repositories to process on a work queue. The schedule may be hourly, daily, weekly, or other basis. The work requests may also be dispatched on a random basis. Scheduler 106 may communicate with a repository schedule 116 for determining when a particular process is scheduled. The repository schedule may detail a type and frequency of spidering for one or more repositories. For example, the repository schedule may identify that repository 102a is full-text indexed on a daily basis and repository 102b has a categorization and metrics extraction performed hourly.

The processes may occur asynchronously. For example, content map 108 may process information in repositories 102a-102n such that a map of all content stored in repositories 102a-102n is provided. A replica of the content map may be stored as content replica 118. Taxonomy engine 110 may be used to determine categories of information stored in repositories 102a-102n. Full-text engine 112 may be used to provide a full-text index of information stored in repositories 102a-102n. Full-text engine 112 may communicate with full-text replica 120 that may be used as a backup for information provided by a full-text engine 112. Metric engine 114 may be used to extract metrics information from information stored in repositories 102a-102n. Taxonomy engine 110, full-text engine 112, and metrics engine 114 may be in communication with content map 108. Therefore, content map 108 may include a map of all information stored in repositories 102a-102n, categories of information stored in repositories 102a-102n, a full-text index of information stored in repositories 102a-102n, and metrics information for information stored in repositories 102a-102n.

Content map 108, taxonomy engine 110, full-text engine 112, and metric engine 114 preferably operate in an asynchronous manner. This enables each of content map 108, taxonomy engine 100, full-text engine 112, and metric engine 114 to operate independently. Content map 108, taxonomy engine 110, full-text engine 112, and metric engine 114 preferably do not rely on each other to perform a particular process. This enables information to be available to users because of a reduction in downtime. Additionally, each of content map 108, taxonomy engine 110, full-text engine 112, and metric engine 114 may be decoupled and replaced individually, thus reducing development costs.

A knowledge management system may be made more reliable by making the failure of a subsystem more recoverable. Scheduler 106 may include a protocol that handles a failure or shutdown of spider component 104. The protocol may be used to enable spider component to transmit a context on shutdown to scheduler 106. The context may then be transmitted back to spider component 104 when spider component 104 resumes functioning. This enables spider component 104 to resume processing work requests from an intermediate state. Any information regarding a failure or shutdown may be transmitted via a completion work queue.

The work queues may include content map 108, taxonomy engine 110, full-text engine 112, and metrics engine 114. The system may also be more fault tolerant by separating various functions into various processes that may be run independently.

Figure 2:
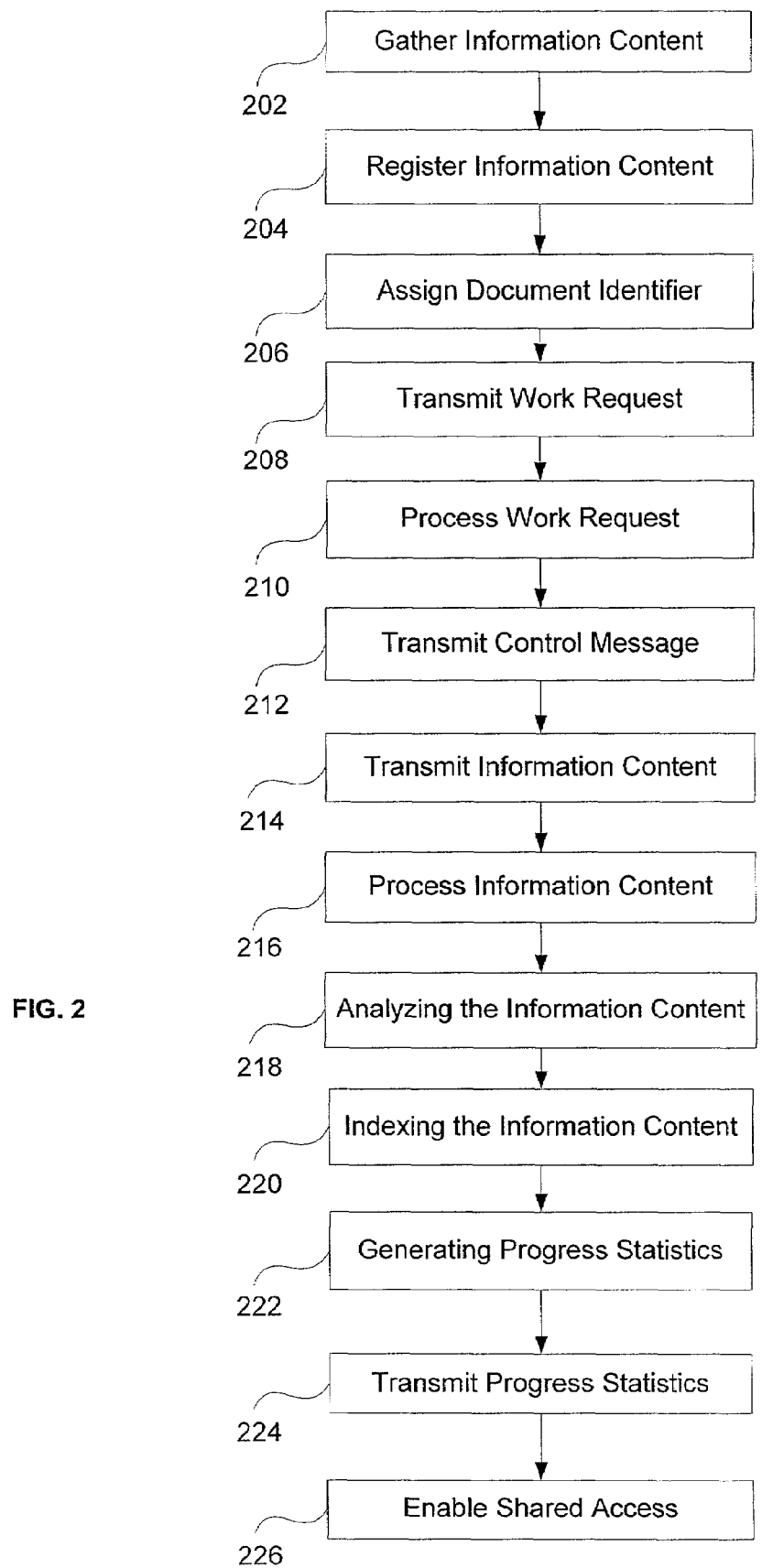
FIG. 2 is a schematic block diagram of the method for data processing according to one embodiment of the invention.

FIG. 2 illustrates a method for processing data in a knowledge management system according to one embodiment of the invention. Information content may be gathered for data processing by a spider component, step 202. The spider component may also register the information content gathered with a content map, step 204. The content map may assign the information content gathered a unique identifier, step 206. The spider component may transmit work requests to, for example, a taxonomy engine, full-text engine or metrics engine, regarding the information content gathered, step 208. The one or more engines may refer to the information content gathered using the unique identifier. The unique identifier may be a part of an extensible markup language (XML) meta-document representation (described in further detail below) that may be transmitted to system users.

The work requests may then be processed, step 210. The work request, may be, for example, processing the repository from which the information content is gathered and converting documents stored in the repository into a standard meta-document representation in XML format. The process of converting the document into a standard meta-document is described in further detail with reference to FIG. 4 below.

The spider component may transmit control messages to system users advising of a start and finish of a work request, step 212. The control messages preferably do not contain any XML content. The meta-document representations may then be transmitted to a designated module for predetermined processing, step 214. The modules may be, for example, a content map, taxonomy engine, full-text indexing engine, and a metrics engine. The modules may then process the meta-documents, step 216. The processing of the meta-documents may vary depending on the module performing the processing. For example, a content map may generate a map of the information content stored in a repository. A taxonomy engine may assign categories to the information content stored in a repository. A full-text indexing engine may generate a full-text index for information content stored in a repository. A metrics engine may extract metrics information from the information content stored in their repository and store only the metrics information. The processes may be performed asynchronously such that each module operates independently and may perform processes in a parallel manner. In this manner, a greater amount of information content in a repository is made available to users at least because the knowledge management system has less downtime for processing information content stored in a repository.

After the meta-documents are processed, the meta-documents may be analyzed, step 218. The analysis may be to determine a type of information content stored in a repository. The meta-documents may also be indexed, step 220.

Progress statistics may also be generated for each of the processes, step 222. The progress statistics may be presented in one or more reports and generated by a spider component and a work queue. The progress statistics may be transmitted to a scheduler component via a completion work queue, step 224. The scheduler component may read the progress statistics and update any corresponding statistics in a repository schedule. The scheduler component may also update a log database with any warnings or errors generated by a work queue. Each module may then be enabled with shared access to a central data structure representing the metrics history and taxonomy or other information via a CORBA service, step 226.

Figure 3:
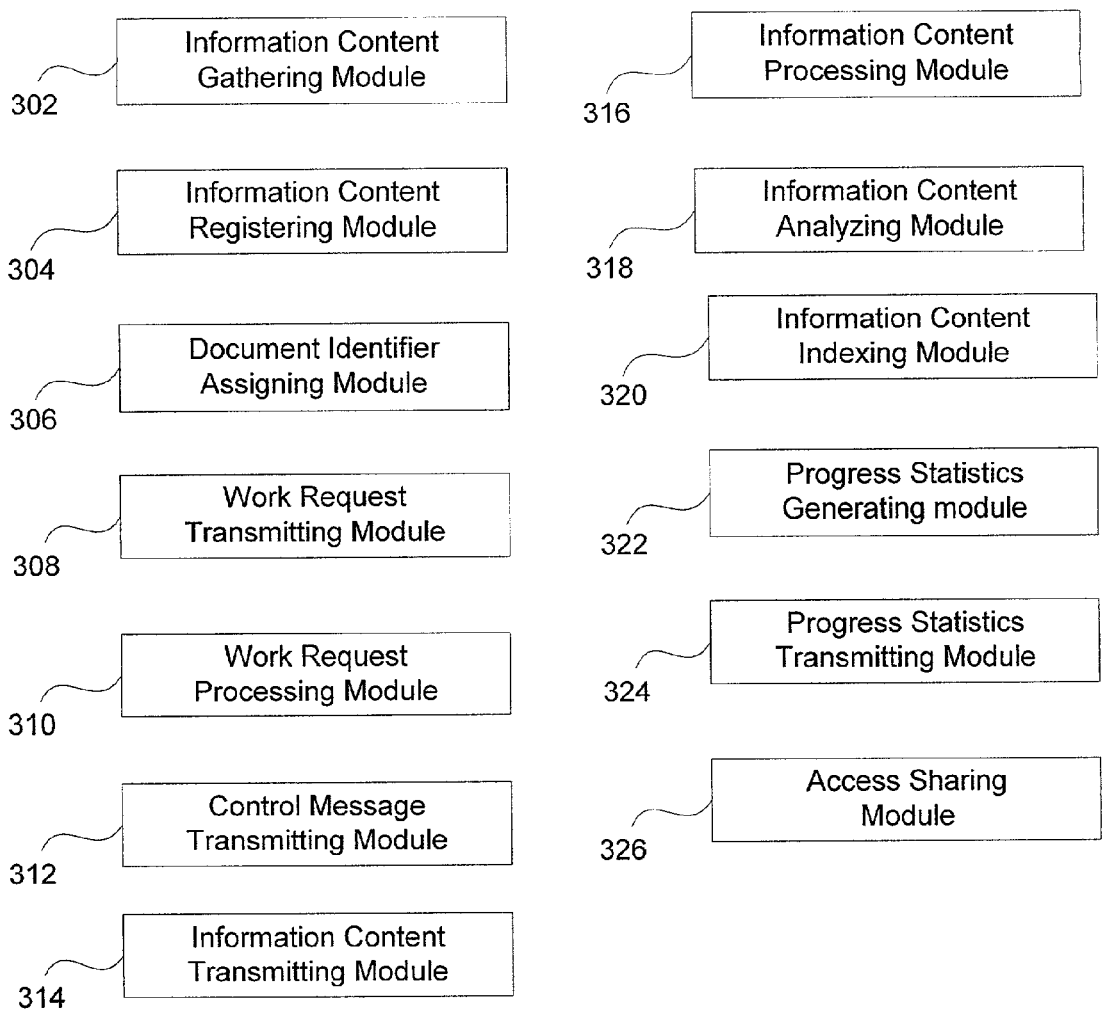
FIG. 3 is a schematic block diagram of data processing according to one embodiment of the invention.

FIG. 3 illustrates a system for processing data in a knowledge management system according to one embodiment of the invention. The system may include an information content gathering module 302, information content registering module 304, document identifier assigning module 306, work request transmitting module 308, work request processing module 310, control message transmitting module 312, information content transmitting module 314, information content processing module 316, information content analyzing module 318, information content indexing module 320, progress statistics generating module 322, progress statistics transmitting module 324, and access sharing module 326.

Information content gathering module 302 may be used to gather information content from one or more repositories based on a repository schedule. The repository schedule may identify a type and frequency with which to gather the information content. Information content registering module 304 may be used to register the information content gathered with, for example, a content map. Document identifier assigning module 306 may then assign the information content gathered one or more unique document identifiers that may be used by, for example, other modules for retrieving and identifying the information content. A work request regarding the information content gathered may be transmitted to a persistent work queue using work request transmitting module 308. The work requests may then be processed for the repository from which the information content was gathered using work request processing module 310. Work request processing module 310 may include converting documents stored in a repository into a standard meta-document representation in extensible markup language (XML) first. Control message transmitting module 312 may be used to transmit control messages to one or more users that provide a status regarding work requests. The control messages may identify a start and/or finish of a work request or other information.

The meta-documents may then be transmitted to a processing work queue for further processing using information content transmitting module 314. The processing may be, for example, full-text indexing, categorization, metrics extraction, or other process. The documents may be processed using information content processing module 316.

After processing the meta-documents, the meta-documents may be analyzed using information content analyzing module 318. The analysis may include determining a type of information stored in the repository. The meta-documents may also be indexed using information content indexing module 320.

Progress statistics regarding the processes performed on the information content gathered may be generated using progress statistics generating module 322. The progress statistics may be generated in one or more reports. The progress statistics may be transmitted to other components in a knowledge management system using progress statistics transmitting module 324. All components within the knowledge management system may be provided with shared access to a central data structure representing the metrics history and taxonomy of the information content via a CORBA service using access sharing module 326.

Figure 4:
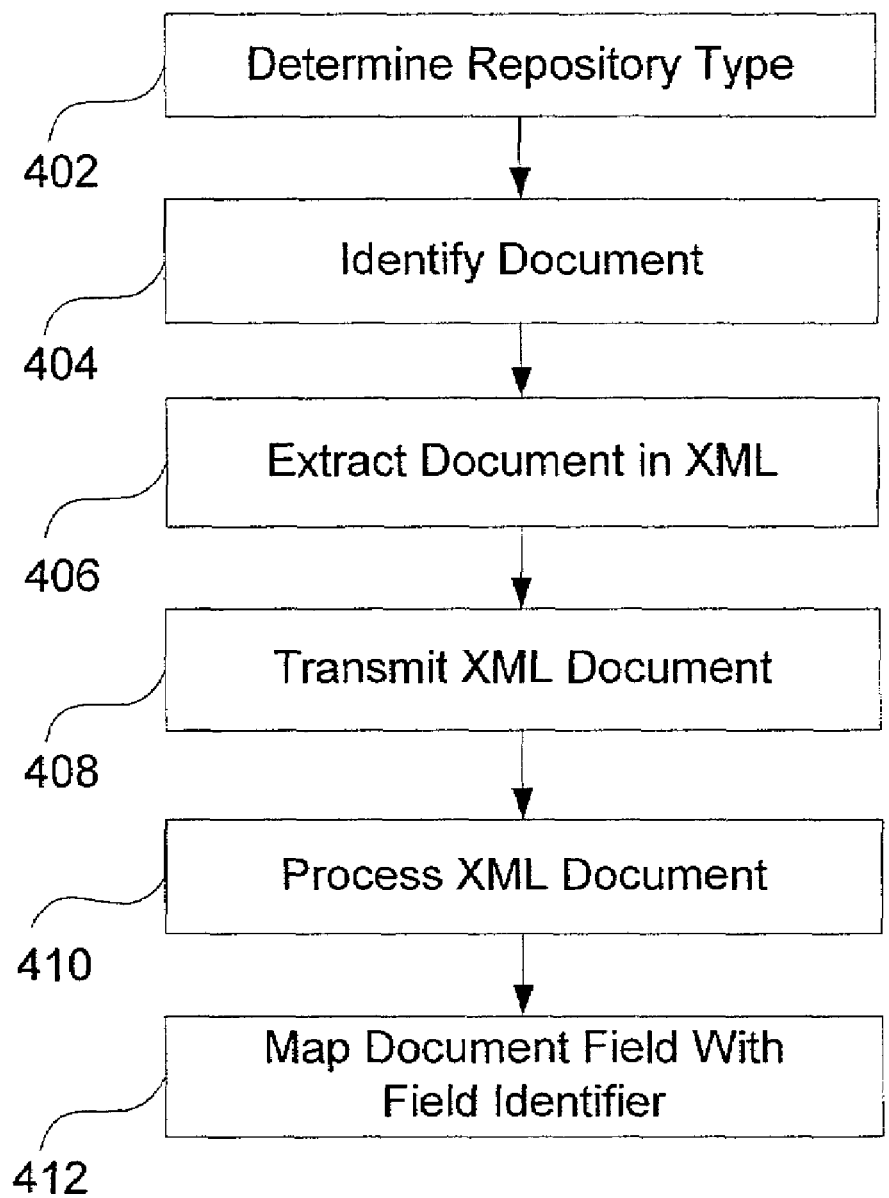
FIG. 4 is a schematic block diagram of a method for normalizing documents in XML format according to one embodiment of the invention.

FIG. 4 illustrates a method for processing a work request according to one embodiment of the invention. A work request may be processed by determining a repository type from which information content is gathered, step 402. The document may then be identified, step 404. The document may then be extracted from the repository in XML format, step 406. The document extracted may be a meta-document. The meta-document may include metrics information from the document. For example, the document may include author, title, subject, date created, date modified, list of modifiers, links list information, and other information. The meta-document may be transmitted to a work queue for further processing, step 408. The meta-document may then be processed according to a pre-determined process for the work queue, step 410. The work queue may, for example, categorize, full-text index, or perform other process on the meta-document. Fields within the meta-document may be mapped with a field identifier, step 412. For example, an author of a document may be mapped with an author field, a creation date may be mapped with a date created field, a title may be mapped with a title field, and other metrics information may be mapped with a corresponding field designation identifier.

Figure 5:
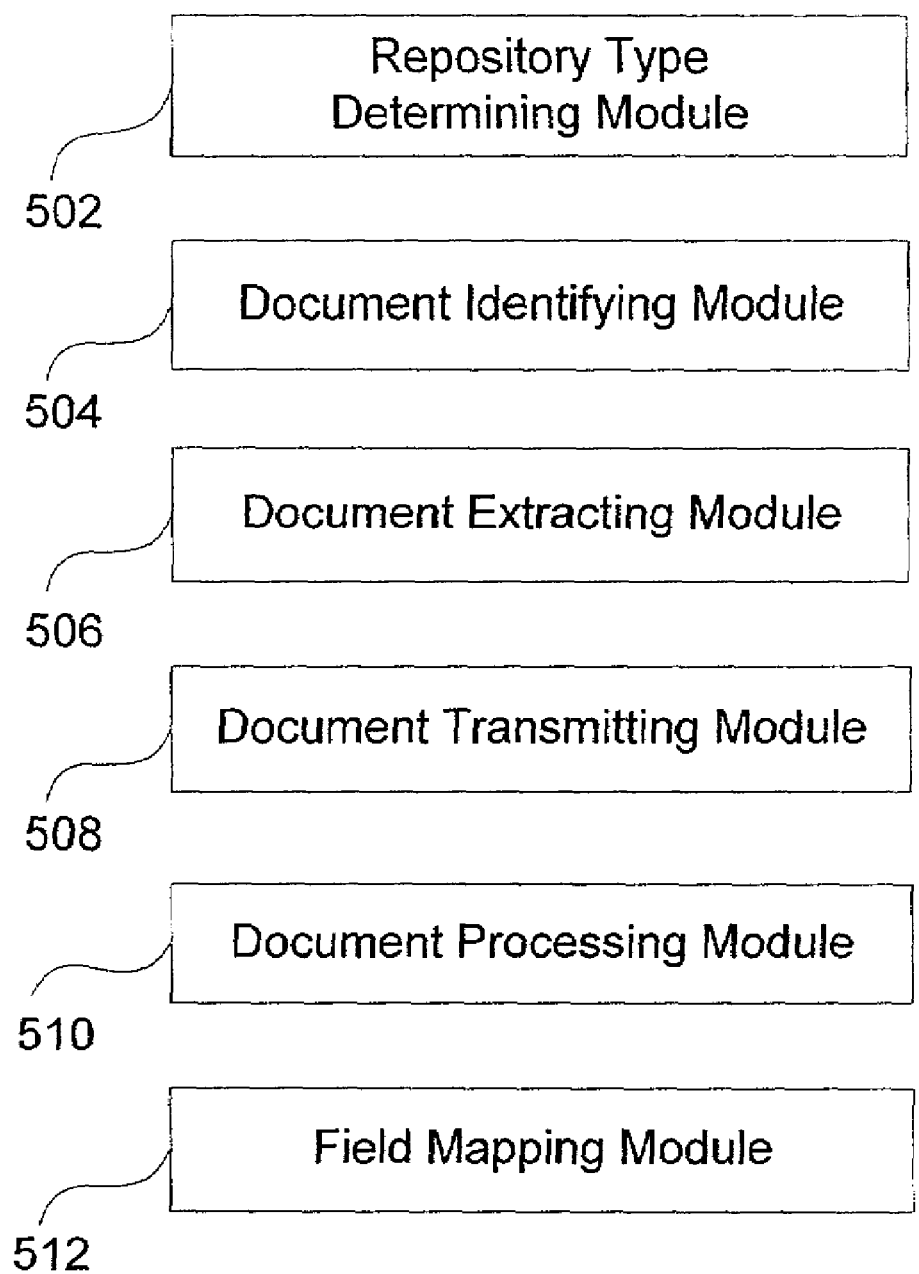
FIG. 5 is a schematic block diagram of a system for normalizing documents using XML according to one embodiment of the invention.

FIG. 5 illustrates a system for processing a work request according to one embodiment of the invention. The system may include repository type determining module 502, document identifying module 504, document extracting module 506, document transmitting module 508, document processing module 510, and field mapping module 512.

Repository type determining module 502 may determine a repository type from which a document may be gathered. Document identifying module 504 may identify the document to be collected from the repository. Document extracting module 506 may extract the document from the repository. Document extracting module 506, however, may convert the document stored in the repository into a standard meta-document representation in an XML format. The meta-document may include meta-data regarding the document. For example, the meta-document may include author, title, subject, date created, date modified, list of modifiers, and links list information.

The meta-document may then be transmitted to a work queue for processing using document transmitting module 508. The meta-document may then be processed according to a process designated for a particular work queue using document processing module 510. The processes may include, for example, categorization, full-text indexing, metrics extraction or other process. Field mapping module 512 may be used to map fields in the meta-document with a field designation identifier. For example, author, title, and subject information may be mapped with an author field, title field, and subject field, respectively. Other fields may also be mapped.

Other embodiments and uses of the invention will be apparent to those skilled in the art in consideration of the specification and practice of the invention is disclosed herein. The specification and examples should be considered exemplary only. For example, although the invention has been described in terms of a document, a document may be any or current document that may be categorized; for example, electronic mail messages, graphic files, or other type of electronic document. Additionally, although the invention has been described in terms of multiple modules, fewer or a greater number of modules may be used and modules may not be provided in the same location. The scope of the invention is only limited by the claims appended hereto.

What is claimed is:

1. A method for using extensible markup language to normalize one or more object repositories, each of the one or more object repositories having one of a plurality of object repository types, the method comprising the steps of:
- determining, from the plurality of possible object repository types, the one or more object repository types of the one or more object repositories that store at least one object, wherein the object comprises metadata;
- identifying the at least one object stored in the one or more object repositories;
- extracting at least one portion of the at least one object by generating a meta-document representation of the at least one portion, the meta-document representation being generated in extensible markup language (XML) format;
- transmitting the meta-document representation to a processor; and
- processing the meta-document representation on the processor to normalize the one or more object repositories, wherein processing the meta-document representation comprises mapping a field in the meta-document representation with a field designation identifier.

2. The method of claim 1, wherein some of the metadata is preserved.

3. The method of claim 2, wherein the metadata that is preserved includes at least one of author, title, subject, date created, date modified, list of modifiers, and link list information.

4. The method of claim 1, wherein processing the meta-document representation further comprises one or both of categorization and full-text indexing.

5. The method of claim 1, wherein the processor comprises at least one of a full-text engine, a metrics engine, and a taxonomy engine.

6. A system for using extensible markup language to normalize one or more object repositories, each of the one or more object repositories having one of a plurality of possible object repository types, the system comprising:
- a determining module that determines, from the plurality of possible object repository types, the one or more object repository types of the one or more object repositories that store at least one object, wherein the at least one object comprises metadata;
- an identifying module that identifies the at least one object stored in the one or more object repositories;
- an extracting module that extracts at least one portion of the at least one object by generating a meta-document representation of the at least one portion, the meta-document representation being generated in extensible markup language (XML) format; and
- a transmitting module that transmits the meta-document representation to a processor that processes the meta-document representation to normalize the one or more object repositories,
- wherein processing the meta-document representation comprises mapping a field in the meta-document representation with a field designation identifier.

7. The system of claim 6, wherein some of the metadata is preserved.

8. The system of claim 7, wherein the metadata that is preserved includes at least one of author, title, subject, date created, date modified, list of modifiers, and link list information.

9. The system of claim 6, wherein processing the meta-document representation further comprises one or both of categorization and full-text indexing.

10. The system of claim 6, wherein the processing module comprises at least one of a full-text engine, a metrics engine, and a taxonomy engine.

11. A system for using extensible markup language to normalize one or more object repositories, each of the one or more object repositories having one of a plurality of possible object repository types, the system comprising:
- determining means for determining, from the plurality of possible object repository types, the one or more object repository types of the one or more object repositories that store at least one object, wherein the object comprises metadata;
- identifying means for identifying the at least one object stored in the one or more object repositories;
- extracting means for extracting at least one portion of the at least one object by generating a meta-document representation of the at least one portion, the meta-document representation being generated in extensible markup language (XML) format; and
- transmitting means for transmitting the meta-document representation to a processor that processes the meta-document representation to normalize the one or more object repositories,
- wherein processing the meta-document representation comprises mapping a field in the meta-document representation with a field designation identifier.

12. The system of claim 11, wherein some of the metadata is preserved.

13. The system of claim 12, wherein the metadata that is preserved includes at least one of author, title, subject, date created, date modified, list of modifiers, and link list information.

14. The system of claim 11, wherein processing the meta-document representation further comprises one or both of categorization and full-text indexing.

15. The system of claim 11, wherein the processing means comprises at least one of a means for full-text indexing the at least one object, means for extracting metrics information from the at least one object, and means for categorizing the at least one object.

16. A processor readable medium comprising processor readable code for causing a processor to normalize one or more object repositories, each of the one or more object repositories having one of a plurality of possible object repository types, the medium comprising:
- determining code that causes a processor to determine, from the plurality of possible object repository types, the one or more object repository types of the one or more object repositories that store at least one object, wherein the at least one object comprises metadata;
- identifying code that causes a processor to identify the at least one object stored in the one or more object repositories;
- extracting code that causes a processor to extract at least one portion of the at least one object by generating a meta-document representation of at least one portion, the meta-document representation being generated in extensible markup language (XML) format;
- transmitting code that causes a processor to transmit the meta-document representation to a processor; and
- processing code that causes the processor to process the meta-document representation to normalize the one or more object repositories,
- wherein processing the meta-document representation comprises mapping a field in the meta-document representation with a field designation identifier.

17. The medium of claim 16, wherein some of the metadata is preserved.

18. The medium of claim 17, wherein the metadata that is preserved includes at least one of author, title, subject, date created, date modified, list of modifiers, and link list information.

19. The medium of claim 16, wherein processing the meta-document representation further comprises one or both of categorization and full-text indexing.

20. The medium of claim 16, wherein the processing code comprises at least one of a full-text engine, a metrics engine, and a taxonomy engine.

* * * * *